United States Patent
Kalkbrenner et al.

(10) Patent No.: US 11,719,922 B2
(45) Date of Patent: Aug. 8, 2023

(54) SINGLE PLANE ILLUMINATION MICROSCOPE

(71) Applicant: Carl Zeiss Microscopy GmbH, Jena (DE)

(72) Inventors: Thomas Kalkbrenner, Jena (DE); Ralf Netz, Jena (DE); Helmut Lippert, Jena (DE); Joerg Siebenmorgen, Jena (DE)

(73) Assignee: CARL ZEISS MICROSCOPY GMBH, Jena (DE)

( * ) Notice: Subject to any disclaimer, the term of this patent is extended or adjusted under 35 U.S.C. 154(b) by 248 days.

(21) Appl. No.: 17/230,613

(22) Filed: Apr. 14, 2021

(65) Prior Publication Data

US 2021/0231936 A1    Jul. 29, 2021

Related U.S. Application Data

(63) Continuation of application No. 16/342,387, filed as application No. PCT/EP2017/076824 on Oct. 20, 2017, now Pat. No. 10,983,322.

(30) Foreign Application Priority Data

Oct. 28, 2016   (DE) .................... 10 2016 120 683.0

(51) Int. Cl.
  *G02B 21/00*       (2006.01)
  *G02B 21/32*       (2006.01)
(52) U.S. Cl.
  CPC ....... *G02B 21/0032* (2013.01); *G02B 21/006* (2013.01); *G02B 21/32* (2013.01)
(58) Field of Classification Search
  CPC ... G02B 21/32; G02B 21/006; G02B 21/0032
  See application file for complete search history.

(56) References Cited

U.S. PATENT DOCUMENTS

| 7,554,725 B2 | 6/2009 | Stelzer et al. |
| 8,547,634 B2 | 10/2013 | Power et al. |

(Continued)

FOREIGN PATENT DOCUMENTS

| DE | 10257423 A1 | 6/2004 |
| DE | 102007047464 A1 | 4/2009 |

(Continued)

OTHER PUBLICATIONS

Japanese Office Action for JP 2019-522395 dated Oct. 5, 2021.

(Continued)

*Primary Examiner* — Cara E Rakowski
(74) *Attorney, Agent, or Firm* — Duane Morris LLP

(57) ABSTRACT

A single plane illumination microscope having an illumination optical system for illuminating a sample located on a sample carrier in a medium, and which is parallel to a planar reference surface. The sample is illuminated by a light sheet via an illumination light path. A detection optical system has a detection beam path. The optical axes of the illumination and detection optical systems each define an angle that is not equal to zero degrees along with the normal to the reference surface. A barrier layer system includes at least one layer of a given material having a given thickness and separates the medium from the illumination and detection optical systems. A base area of the barrier layer system is in contact with the region that is accessible for illumination and detection activities, said base area running parallel to the reference surface. At least one corrective element in the illumination beam path and/or the detection beam path allows those aberrations to be reduced which are created when light to be detected or light for illuminating the sample penetrates interfaces of the barrier layer system at an angle. The microscope has means, which are independent of the generation of the light sheet, for applying, via at least one (Continued)

manipulation beam path, light intensity to the sample in substantially point-shaped regions of the light sheet plane or in a given volume that at least temporarily encompasses the light sheet plane.

19 Claims, 7 Drawing Sheets

(56) References Cited

U.S. PATENT DOCUMENTS

| | | | |
|---|---|---|---|
| 2010/0193673 A1* | 8/2010 | Power | G02B 21/0032 250/251 |
| 2012/0062722 A1 | 3/2012 | Sase | |
| 2012/0206798 A1 | 8/2012 | Knop et al. | |
| 2015/0253560 A1 | 9/2015 | Otte et al. | |
| 2016/0048012 A1 | 2/2016 | Knebel et al. | |
| 2016/0054553 A1* | 2/2016 | Pantazis | G02B 21/0076 250/206 |
| 2016/0154236 A1 | 6/2016 | Siebenmorgen et al. | |
| 2016/0291303 A1 | 10/2016 | Degen et al. | |
| 2017/0038575 A1 | 2/2017 | Pretorius | |
| 2018/0081159 A1 | 3/2018 | Lippert et al. | |
| 2019/0170995 A1* | 6/2019 | Siebenmorgen | G02B 21/02 |

FOREIGN PATENT DOCUMENTS

| | | |
|---|---|---|
| DE | 102012110077 A1 | 6/2014 |
| DE | 102013213781 A1 | 9/2014 |
| DE | 102013107297 A1 | 1/2015 |
| DE | 102013112600 A1 | 5/2015 |
| DE | 102014104977 A1 | 10/2015 |
| DE | 102015103802 A1 | 9/2016 |
| JP | 2010540995 A | 12/2010 |
| WO | 2004/053558 A1 | 6/2004 |
| WO | 2006/097101 A1 | 9/2006 |
| WO | 2011155628 A1 | 12/2011 |
| WO | 2015017245 A1 | 2/2015 |
| WO | 2015/109323 A2 | 7/2015 |
| WO | 2016/146503 A1 | 9/2016 |
| WO | 2016146503 A1 | 9/2016 |

OTHER PUBLICATIONS

Translation for Japanese Office Action for JP 2019-522395 dated Oct. 5, 2021.

Huisken, Jan, et al.; "Selective plane illumination microscopy techniques in developmental biology"; Development 136(12):1963-1975.

Tsuda, Sachiko, et al.; "Probing the function of neuronal populations: combining micromirror-based optogenetic photosimulation with voltage-sensitive dye imaging"; Neuroscience Research 2013; 75(1):76-81.

Grossman, Nir, et al.; "Multi-site optical excitation using ChR2 and micro-LED array"; Journal of Neural Engineering 2010; 7(1): 1-13.

Anselmi, Francesca, et al.; "Three-dimensional imaging and photostimulation by remote-focusing and holographic light patterning"; PNAS 2011; 108(49): 19504-19509.

Whyte, Graeme, et al.; "Experimental demonstration of holographic three-dimensional light shaping using a Gerchberg-Saxton algorithm"; New Journal of Physics 2005; 7(117):1-12.

Nikolenko, Volodymyr, et al.; "SLM microscopy: scanless two-photon imaging and photostimulation with spatial light modulators"; Frontiers in Neural Circuits 2008; 2(5):1-14.

Oron, Dan, et al.; "Scanningless depth-resolved microscopy"; Optics Express 2005; 13(5): 1468-1476.

Notification of Transmittal and Translation of the International Preliminary Report on Patentability dated May 9, 2019.

\* cited by examiner

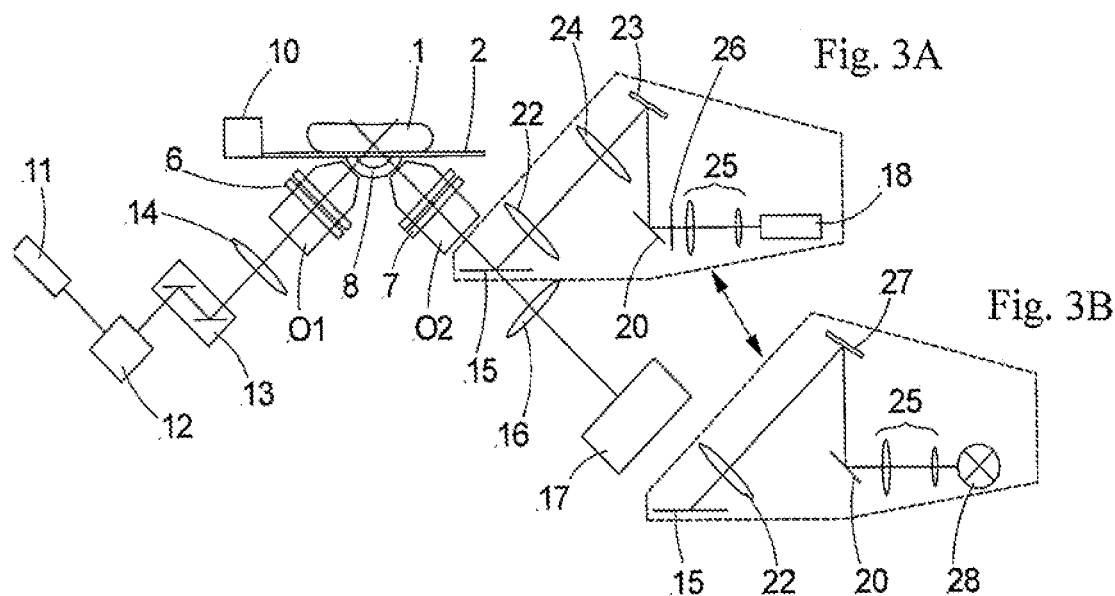
Fig. 3A
Fig. 3B
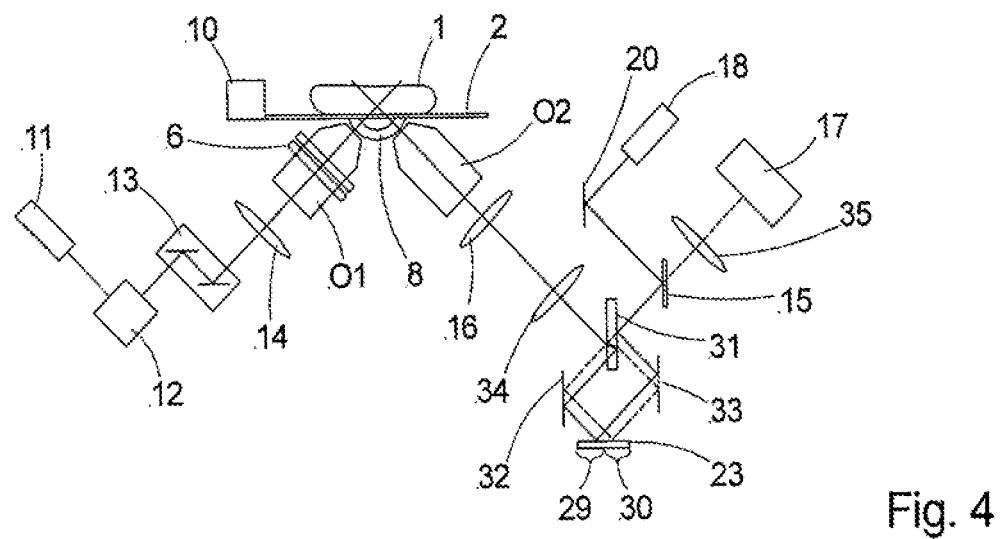
Fig. 4

SINGLE PLANE ILLUMINATION MICROSCOPE

RELATED APPLICATIONS

The present application is a continuation of U.S. patent application Ser. No. 16/342,387 filed on Apr. 16, 2019, which is a U.S. National Stage application of International PCT Application No. PCT/EP2017/076824 filed on Oct. 20, 2017 which claims priority benefit of German Application No. DE 10 2016 120 683.0 filed on Oct. 28, 2016, the contents of each are incorporated by reference in their entirety.

FIELD OF THE INVENTION

The invention relates to a light sheet microscope, with an illumination optical unit for illuminating a sample. The sample is located on a sample carrier in a medium, for example a liquid or in a gel. The sample carrier is here parallel to a planar reference surface; this reference surface can be, for example, the plane of a sample stage on which the sample carrier is located, for example a plane-parallel glass plate of specified thickness or a corresponding container having walls with a transparent bottom that is parallel to said reference surface. The container can be open, or it can be closed with a transparent cover glass. The illumination optical unit serves for illuminating the sample via an illumination beam path, the illumination is performed using a light sheet having a light sheet plane which encloses an illumination angle that differs from zero with the normal of the reference surface. The light sheet microscope additionally comprises a detection optical unit having a detection beam path with an optical axis, which encloses a detection angle that differs from zero with the normal of the reference surface in the region of the sample carrier. The angle between detection and illumination axes is frequently 90°, although this is not a mandatory specification.

The light sheet microscope additionally also has a separation layer system with at least one layer that is made of a specified material with a specified thickness and separates the medium in which the sample is situated from the illumination and detection optical units. The separation layer system is here in contact, at least in the region that is accessible for illumination and detection, with the medium by way of a base surface that is parallel to the reference surface. In the case of an inverted light sheet microscope, in which illumination and detection are arranged underneath the sample, the transparent bottom of the sample container or the sample carrier plate together with the air layer or an immersion medium, which are situated between the bottom and the optical units, forms the separation layer system. Observed from above, a transparent lid of the sample container, for example, together with the air layer or the immersion medium forms the separation layer system between lid and illumination and detection optical unit.

Since the illumination and the detection optical unit enclose with the normal of the reference surface an angle that differs from zero, at least one correction element is arranged in the illumination and/or in the detection beam path to reduce such aberrations that arise due to the oblique passage of light that is to be detected or light for illuminating the sample through interfaces of the separation layer system.

BACKGROUND

Light sheet microscopes are used in particular when examining biological samples, in which the samples are illuminated with a light sheet having a plane that intersects the optical axis of the detection at an angle that differs from zero. The light sheet here typically encloses a right angle with the detection direction, which may correspond for example to the optical axis of a detection objective that is used only for detection. Using this technique, which is also referred to as SPIM (selective or single plane illumination microscopy), spatial recordings even of relatively thick samples can be produced within a relatively short time. A visual, spatially extended representation of the sample is possible based on optical sections in combination with a relative movement between sample and light sheet, i.e., in a direction perpendicular to the section plane.

SPIM is preferably used in fluorescence microscopy, where it is known as LSFM (light sheet fluorescence microscopy). As compared to other established methods, such as confocal laser scanning microscopy or two-photon microscopy, LSFM methods and arrangements have several advantages: Since the detection can be undertaken in the wide field, it is moreover possible to capture relatively large sample regions. Even though the resolution is lower than in confocal laser scanning microscopy, it is possible to analyze thicker samples by way of LSFM, because the penetration depth is greater. Moreover, the exposure of the samples to light is lowest with this method, which reduces, among other things, the risk of undesirable bleaching of the sample, because it is illuminated only by a thin light sheet at an angle that differs from zero with respect to the detection direction.

The light sheet used can here be a static light sheet, produced for example using cylindrical lenses, or a quasi-static light sheet. The latter can be produced by rapidly scanning the sample with a light beam. The light sheet-type illumination arises when the light beam undergoes a very fast relative movement with respect to the sample under observation, which is repeated multiple times in temporal succession so as to line up. The integration time of the camera on whose sensor the sample is ultimately imaged is selected such that scanning is concluded within the integration time. Instead of a camera having a two-dimensional sensor field, a line scan sensor in combination with another scan (rescan) can also be used in the detection optical unit. In addition, detection can also be a confocal detection.

SPIM has become established and been described many times in the literature, for example, in DE 102 57 423 A1 and in WO 2004/053558 A1 which is based on the former, and in the overview article "Selective plane illumination microscopy technics in developmental biology" by J. Huisken et al., published in 2009 in the journal Development, vol. 136, p. 1963.

Light sheet microscopes operating in accordance with the SPIM method have so far largely only been used to observe samples. However, for a more in-depth examination of samples it is often desirable to perform optical manipulation thereon. The term optical manipulation in the context of the present invention is understood to mean photo-stimulation, that is to say that deposition of light intensity at specified locations and times in the sample in laterally and axially restricted regions of a shape, size and, for simultaneous manipulation, number that can be prescribed, wherein the sample must not be penetrated completely by the manipulation light and wherein the deposition of the light intensity causes an optically driven reaction at the specified locations. Such reactions can be, for example, bleaching of the sample, photoconversion, uncaging etc. Optical manipulation in samples in which the manipulation light interacts with the sample along the manipulation direction only in regions that are to be manipulated is to be referred to below as local optical manipulation.

In the prior art, various methods are known in this respect. For example, a point scanner, that is to say a laser scanning microscope in which the detection is not confocal, can be used to quickly target desired positions in a plane, for example in the light sheet plane. Here, high-intensities can be produced in the focus. A disadvantage is here that the individual positions have to be targeted in temporal succession. Positioning in the axial direction must be performed via focusing, for example internal focusing in the objective, or by a corresponding movement of the sample. Another disadvantage is that regions below and above the target position are completely penetrated in the axial direction, wherein, in dependence on the intensity, interactions with the sample may also occur outside the actual focused region. Using appropriate optical units, a multipoint scanner can also be realized, in which a plurality of points are targeted simultaneously.

To produce a two-dimensional intensity pattern, for example a digital micromirror array (DMD array) can be used, which is arranged in an intermediate image plane in the illumination optical unit. The individual pixels can be switched on or off and directly define the illuminated areas in the sample. This is described for example in the article "Probing the function of neuronal populations: combining micromirror-based optogenetic photo-stimulation with voltage-sensitive dye imaging" by S. Tsuda et al., published in "Neuroscience Research" 75 (1), p. 76 in 2013. Instead of a DMD array, it is possible to use an LCD array in transmission, although in this case high losses in the incoming light power occur. Instead of DMDs, It is also possible to use LED arrays, which are then used directly for illumination, and the amplitude of the illumination is modulated in pixel-based fashion, as in the DMD. The advantage over the DMD array is the higher modulation frequency in the MHz range, whereas the modulation frequency in DMD arrays lies in the kHz range. The use of an LED array for structuring the illumination light is described, for example, in the article "Multi-site optical excitation using ChR2 and micro-LED array" by N. Grossman et al., published in "Journal of Neural Engineering" 7 (1), p. 016004 in 2010.

The use of spatial light modulators (SLMs) allows photo-stimulation in spatially extensive areas, in other words not only in a plane for example perpendicular to the detection or illumination direction, but also axially in that direction. The spatial light modulator is to this end arranged in a pupil plane of the manipulation beam path, and a phase pattern is imprinted thereon, which thus changes the phase of the light that is used for manipulation. Imaging then produces the desired intensity distribution. This approach is described, for example, in the article "Three-dimensional imaging and photo-stimulation by remote-focusing and holographic light patterning" by F. Anselmi et al., published in "Proceedings of the National Academy of Sciences" 108 (49), p. 19504 ff in 2011. Here, an intensity distribution is specified, which can be determined for example on the basis of the sample structure from a previously recorded overview image or from a spatial overview scan. Using algorithms based on inverse Fourier transforms, the required phase pattern which is to be imprinted on the SLM is iteratively calculated from said specified intensity distribution. This procedure is described for example in the article "Experimental demonstration of holographic three-dimensional light shaping using a Gerchberg-Saxton algorithm" by G. Whyte et al., published in "New Journal of Physics" 7, p. 117 in 2005. However, due to the complexity of this procedure and the lower frame rate of the spatial light modulators, which are generally based on liquid-crystal elements, the pattern can here be changed only in a very slow temporal succession, for example at a frequency of a few 10 Hz. As compared to two-dimensional structuring, these methods are approximately a hundred times slower.

Particularly good local restriction of the optical manipulation to a substantially point-shaped area in space can also be accomplished with the concept of multiphoton excitation. Here, a laser pulse having an extremely high intensity only in the focus is imaged into the area. Such a pulse can be produced for example with a femtosecond laser. The wavelength of this laser is selected such that any dyes present in the sample are not excited to fluorescence. The wavelengths are generally in the near infrared. However, the intensity of the light in the focus is so high that the probability that two or more photons are absorbed simultaneously and trigger a corresponding fluorescence-exciting transition is particularly high. Targeted excitation only in the focal plane is possible in this way, rather than above or below the focal plane, as is the case in one-photon excitation, because the intensity there is too low. The penetration depth during imaging when using scanning systems with multiphoton excitation can also be increased. Since moreover wavelengths in the near infrared range are used, this procedure is advantageous in particular for living biological samples. The method for multiphoton excitation can be combined with the point-type scanning, but also with a mulitpoint illumination in which the sample is illuminated in many points at the same time. This can be accomplished for example by a spatial light modulator in the manipulation beam path onto which an iteratively calculated phase pattern has been imprinted. This approach in the context of two-photon excitation is described for example in the article "SLM microscopy: scanless two-photon imaging and photo-stimulation with spatial light modulators" by V. Nikolenko et al., published in the magazine "Frontiers in Neural Circuits", vol. 2 (5), p. 1 on Dec. 19, 2008.

While it is easily possible in the case of the point scanner using multiphoton excitation, in particular two-photon excitation, to produce the depth discrimination by way of the quadratic intensity dependence of the excitation in combination with strong focusing in the plane, this is not possible in wide-field imaging without further auxiliary means. However, if a diffractive optical element is used, such as for example a grating, short laser pulses can be spectrally split. Said diffractive optical element is then imaged via the microscope objective into the sample. Subsequently, the different spectral elements of the pulses of the illumination light take different optical paths and only meet again in the focal plane to form here the original, very short laser pulse. In this way, the peak power of the pulse is maximum only in the focal plane, which in conjunction with the already mentioned quadratic intensity dependence of the two-photon excitation results in the desired depth discrimination even in wide-field illumination. This approach, also referred to as "temporal focusing" is described for example in the article "Scanningless depth-resolved microscopy" by D. Oron et al., published in the magazine "Optics Express" 13 (5), p. 14687 in 2005.

All the above-described methods for gentle photo-stimulation have for the most part not yet been used for light sheet microscopy. However, U.S. Pat. No. 8,547,634 B2 proposes various arrangements for photomanipulation of a sample in light sheet microscopy. All these arrangements here always also comprise manipulation via the illumination beam path, in which the manipulation light is likewise shaped into a light sheet, wherein the light source which is used to produce the light sheet or a dedicated manipulation light source can be used. Axially locally restricted photo-stimulation is not possible in this way. U.S. Pat. No. 8,547,634 B2 additionally describes the option of using, in addition to the first manipulation illumination by way of a light sheet, a second manipulation optical unit in which the manipulation light is guided via the detection optical unit onto the sample. Proposed in this respect is the use of a laser scanning microscope as the second manipulation optical unit. With this second manipulation optical unit, in principle manipulation only in the light sheet plane is possible, but the manipulation light of the second light source penetrates the sample along the normal direction of the light sheet generally in a greater region, or enters it in a greater region. The manipulation or the illumination with manipulation light is also effected in the light sheet plane along the entire extent of the light sheet axially in the illumination light.

SUMMARY OF THE INVENTION

It is therefore an object of the invention to develop a light sheet microscope of the type mentioned in the introductory part in a manner such that a sample-preserving observation of samples is made possible.

This object is achieved in a light sheet microscope of the type mentioned in the introductory part, which is designed in particular for inverse observation of a sample, in that the light sheet microscope comprises only means that are independent of the light sheet generation for causing light intensity to impinge on the sample in substantially point-shaped areas in the light sheet plane or in a specified volume, comprising the light sheet plane at least temporarily, via at least one manipulation beam path.

Due to the restriction to substantially point-shaped areas, that is to say areas which are restricted in particular laterally, for example—albeit not exclusively—in the case of a manipulation in a plane, but preferably also axially with respect to the entire volume of the sample, the size thereof of course depends on different factors such as lateral and axial focusing, the excitation mechanisms used, the manipulation means themselves, etc., a particularly sample-preserving manipulation can be attained. The substantially point-shaped areas can here for their part define a greater area in the sense of a "region of interest" (ROI) both in the two-dimensional and in the three-dimensional space, of which in turn a plurality of mutually independent and non-continuous ROIs can be defined in a volume to be manipulated. The term "point" should here not be understood in the mathematical sense, but is intended to make clear that the areas that are to be selected and manipulated should be as small as possible.

Manipulation and observation/illumination are here in principle independent of one another. For example, the light sheet can be used to observe a region or an ROI of the volume, while manipulation is undertaken in a different region. This other region is only subsequently illuminated by the light sheet. The volume in which manipulation is undertaken or the substantially point-shaped areas therefore do not need to be located in the light sheet plane while intensity is deposited therein. They are captured by the light sheet only subsequently, possibly after a specified time has passed.

The illumination optical unit of the light sheet microscope generally comprises expediently an illumination objective and the detection optical unit comprises a detection objective, wherein illumination and detection can also be effected by way of the same objective, which is to say that the illumination objective can be identical to the detection objective. It is also possible for illumination and detection to share individual optical elements in the beam path, for example correction elements. The means for manipulation can comprise a separate manipulation objective in the manipulation beam path, but manipulation can also be undertaken by way of the illumination objective or by way of the detection objective; in these cases, the manipulation objective is identical to the illumination objective or to the detection objective. These two variants have the advantage that no additional objective is necessary, but the configuration is somewhat less flexible as compared to the use of a dedicated manipulation objective. With particular preference, manipulation is undertaken by way of the detection objective, because the latter is frequently arranged perpendicularly to the light sheet, which makes area-covering manipulation in the light sheet plane or in a volume around the light sheet plane easier.

The manipulation can thus be effected by way of each of the three objectives mentioned, and the elements (explained in detail below) which complement the means for manipulation can generally be used in each of the three objectives, that is to say can be coupled either into the illumination beam path, into the detection beam path, or into a dedicated manipulation beam path. When using the illumination beam path, manipulation and illumination share optical elements, but this is done independently of one another and without mutually influencing one another. In particular, the light used for manipulation is not shaped into a light sheet.

In an embodiment which is easy to realize, the means for manipulation comprise a point scanner for the temporally sequential impingement of light intensity on individual substantially point-shaped areas of the sample, or a multi-point scanner for the temporally sequential impingement on a plurality of substantially point-shaped areas of the sample, a respective quantity of which is able to be impinged on at the same time by light intensity. The multipoint scanner is constructed analogously to the point scanner; for example a microlens array can be used for multipoint generation.

Using a first spatial light modulator, a specified intensity distribution can also impinge on the sample, which is effected substantially at constant amplitude. In order to also imprint a specified amplitude distribution onto the specified intensity distribution, the means for manipulation can comprise a second spatial light modulator.

In a further configuration, the means for manipulation comprise a digital micromirror array (DMD) for producing a specified intensity distribution in a plane which is preferably parallel to the light sheet plane, with particular preference in the light sheet plane. In the case of an orientation that is parallel to the light sheet plane, the manipulation is expediently effected by way of the detection objective or a separate manipulation objective.

The above-mentioned means for manipulation can in a particularly preferred configuration be combined to increase the manipulation speed, because the DMDs are switchable more rapidly than spatial light modulators. In a preferred configuration, the light sheet microscope therefore also comprises switching means, preferably a switching mirror for switching between the first spatial light modulator, the digital micromirror array, or a combination of both. The second spatial light modulator can also be used in addition to the first spatial light modulator. In this way, for example the spatial light modulator can be used to define with a corresponding phase pattern a plurality of spatial areas which can then be rapidly switched on and off individually by the DMD.

If the manipulation objective is identical to the detection objective, the first or second spatial light modulator can be used in a particularly preferred configuration both for manipulating the sample and for correcting aberrations. To this end, a first region of one of the spatial light modulators is embodied for causing a specified intensity or amplitude distribution to impinge on the sample and as a correction element, and a second region of the spatial light modulator is embodied only as a correction element in the detection beam path. This can be achieved by way of appropriate control of the SLM. Deflection means are provided here, which deflect the light that is to be detected onto the second region and the light that is used for the manipulation onto the first region. This can also be realized equivalently with the illumination objective if the manipulation is effected via the illumination objective, that is to say if it is identical to the manipulation objective, or—if necessary—also with the manipulation objective.

In this way, costs can be reduced because no separate correction element needs to be provided for the detection beam path or the illumination beam path. Additionally or alternatively it is of course also possible to use correction elements as are known from the prior art, for example what are referred to as Alvarez plates, which are two displaceable, substantially plate-type elements onto which a corresponding surface structure that corrects aberrations is imprinted and which can be laterally displaceable with respect to one another. The surface structures can be freeform surfaces, the plates have the function of wavefront modulators. By way of example, such a correction element is described in DE 10 2014 104 977 A1. The correction element can additionally or alternatively also be configured as an optical transfer system, what is known as a virtual relay, as is described for example in DE 10 2013 112 600 A1. Said correction element can be dimensioned such that it can be used both for the illumination objective and the detection objective, and is placed between those objectives and the separation layer system. Further correction elements, which can likewise be used individually or in combination with those already mentioned, comprise deformable mirrors or, as already mentioned, spatial light modulators.

The deflection means preferably comprise a dichroic element having active optical surfaces which are arranged parallel with respect to one another and preferably perpendicularly to the active optical surface of the spatial light modulator, wherein the beam path is guided such that the light that is used for the manipulation and is to be detected is guided in each case twice onto the dichroic element, and the deflection onto the respective region is achieved by way of the thickness of the dichroic element. The dichroic element in this case does not necessarily have to be arranged perpendicularly, as described, but if it is correspondingly inclined, it may need to be even thicker.

The configuration with an SLM which is divided into two regions that are illuminated differently can be analogously transferred to the illumination beam path, wherein here one region is for light sheet generation and the other region is for manipulation illumination. In addition, the SLM can in both regions also assume the function of a correction element.

With particular advantage, the light sources, wavelengths and intensities of the manipulation light are designed for excitation of two and more photon transitions, with the result that a particularly sample-preserving manipulation in locally very highly spatially restricted areas can be achieved. For axial localization of the intensity of the light that is used for manipulation along the axis of the manipulation beam path, that is to say for example the detection objective, preferably a temporal-focusing mechanism is provided which preferably comprises a femtosecond pulsed laser with a controller for controlling the group velocity dispersion.

It goes without saying that the aforementioned features and those yet to be explained below can be used not only in the combinations specified but also in other combinations or on their own, without departing from the scope of the present invention.

BRIEF DESCRIPTION OF THE DRAWINGS

The invention is explained in more detail below for example on the basis of the accompanying drawings, which also disclose features essential to the invention. In the figures.

DETAILED DESCRIPTION OF THE DRAWINGS

Figure 1:
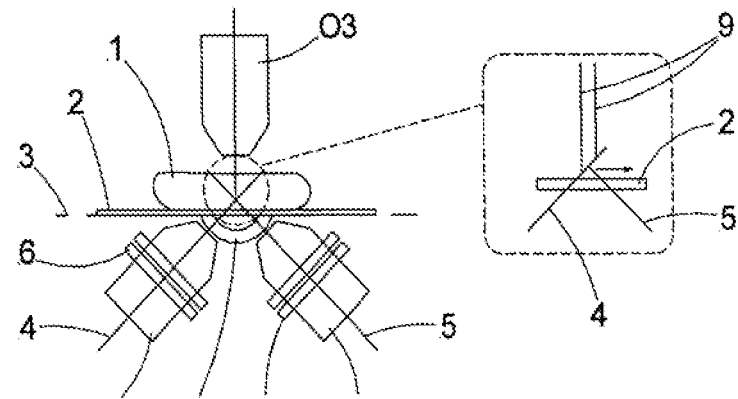
FIG. 1 schematically illustrates a general set up for sample-preserving light sheet microscopy, FIG. 2 schematically illustrates a first configuration of the manipulation by way of the detection objective, FIG. 3A schematically illustrates a further configuration for manipulation by way of the detection objective, FIG. 3B schematically illustrates a module that can be swapped into FIG. 3A for a variation of the configuration of FIG. 3A, FIG. 4 schematically illustrates a fourth configuration of the manipulation by way of the detection objective, FIG. 5 schematically illustrates a fifth configuration of the manipulation by way of the detection objective, FIG. 6A schematically illustrates a configuration for manipulation by way of a separate manipulation objective, FIG. 6B schematically illustrates a variation of the configuration shown in FIG. 6A, FIG. 6C schematically illustrates a further variation of the configuration shown in FIG. 6A, FIG. 7A schematically illustrates a possible instance of manipulation by way of the illumination objective, FIG. 7B schematically illustrates a variation of the instance of FIG. 7A, FIG. 8 schematically illustrates a first configuration of a light sheet microscope with manipulation by way of the illumination objective, FIG. 9 schematically illustrates a second configuration of the manipulation by way of the illumination objective, FIG. 10 schematically illustrates a third configuration of the manipulation by way of the illumination objective, FIG. 11 schematically illustrates the use of temporal focusing with the light sheet, FIG. 12 schematically illustrates a principle diagram of the manipulation from two directions, FIG. 13 schematically illustrates an arrangement for multi-photon manipulation.

To begin with, FIG. 1 shows the general setup as can be used for the sample-preserving light sheet microscopy with simultaneous manipulation. A sample 1 is arranged on a sample carrier 2. Examination using light sheet microscopy is here effected in inverse configuration; an illumination objective O1 and a detection objective O2 are arranged below the sample carrier 2, which is part of a separation layer system. The sample carrier 2 is parallel to a planar reference surface 3, which can correspond for example to the bottom side of the sample carrier 2. The sample 1 can be embedded in a medium, which is not shown separately here. Using the illumination objective O1, the sample 1 is illuminated via an illumination beam path with a light sheet, the latter having a light sheet plane, here corresponding to the optical axis 4 of the illumination objective O1, that encloses an illumination angle that differs from zero with the normal of the reference surface. The detection objective O2 is part of a detection optical unit having a detection beam path with an optical axis 5 which encloses a detection angle that differs from zero with the normal of the reference surface 3 in the region of the sample carrier 2. The optical axis 5 here corresponds to the optical axis of the detection objective O2. For correcting or reducing such aberrations that occur due to the oblique passage of light that is to be detected or of light for illuminating the sample 1 through interfaces of the separation layer system—comprising the sample carrier 2 and the air layer that is located therebelow—the light sheet microscope comprises at least one correction element, in the present case a plurality of correction elements. Firstly, the illumination objective O1 comprises a correction element in the form of a wavefront manipulator 6, and the detection objective O2 comprises a correction element in the form of a further wavefront manipulator 7; the wavefront manipulators 6 and 7 are formed by plates having freeform surfaces that are displaceable laterally relative to one another with respect to the optical axes 4 and 5; these plates are also referred to as Alvarez plates. In addition, a further correction element in the form of a virtual relay, that is to say an optical transfer system 8, which is common for both objectives O1 and O2, is arranged between the objectives and the bottom side of the sample carrier 2. By way of example, a separate manipulation objective O3 is used here for the manipulation for illustrative purposes. Using this objective—or using the other two objectives—it is possible to realize preferably exclusively means, which are independent of the light sheet generation, for causing light intensity to impinge on the sample, preferably exclusively in substantially point-shaped areas of the light sheet plane or in a specified volume which at least temporarily comprises the light sheet plane, via at least one manipulation beam path. In FIG. 1 on the right, in the section indicated by a dashed box, two manipulation rays 9 are indicated, the ends of which are located in the light sheet and thus in the focal plane of the detection objective O2, and on which a specified intensity is to impinge.

The means for causing light intensity to impinge on the sample 1 will be explained in more detail below with reference to various exemplary embodiments.

Figure 2:
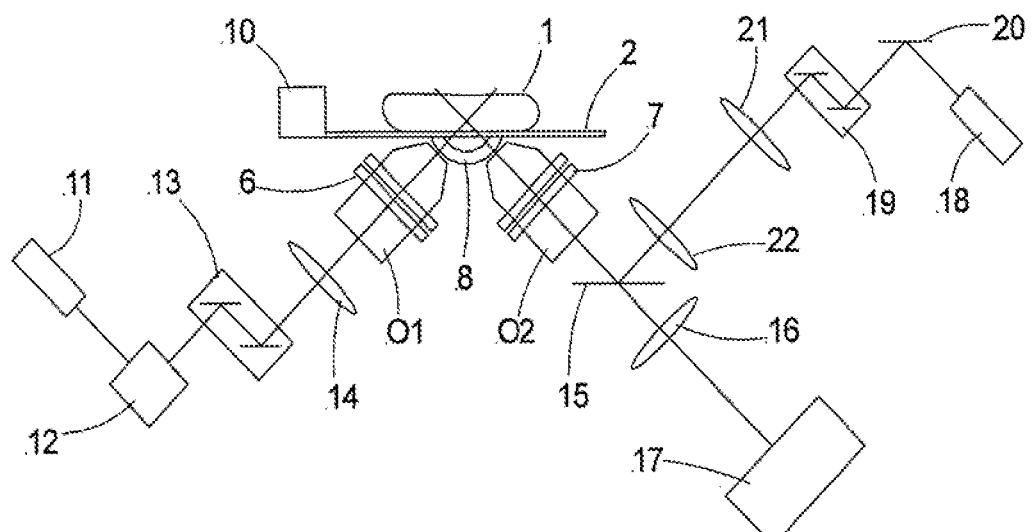

FIG. 2 shows an embodiment of a light sheet microscope in which the manipulation is undertaken by way of the detection objective O2, that is to say in which the manipulation objective is identical to the detection objective O2. The sample stage with the sample carrier 2 is here provided with a sample stage controller 10 for spatially positioning the sample 1 in all three spatial directions. The illumination is effected by way of means which are typical for light sheet microscopes. An illumination laser 11 emits light having an illumination wavelength. In a beam shaping unit 12, a beam is shaped, which is guided to a light sheet scanner 13, which serves for the quasi-static light sheet generation and the positioning of the light sheet. The light sheet is imaged into the sample 1 via a tube lens 14 and the objective O1. The beam shaping unit 12 serves to imprint a desired intensity profile on the light beam, for example in accordance with a Gaussian distribution or a Bessel beam, which is then also imprinted on the light sheet in cross section perpendicular to the light sheet plane by way of scanning.

The light to be detected passes through the detection objective O2, passes through a dichroic beam splitter 15, and is imaged onto an area scan detector, for example part of a camera 17, via a tube lens 16. The detected signals are subsequently processed further and/or presented.

For the manipulation, a stimulation laser 18 is used, the light of which is guided to a stimulation scanner 19, which is embodied here in the form of a point scanner, with the interconnection of a deflection element in the form of a mirror 20, which merely serves to keep the construction of the arrangement compact. Via a further lens 21 and a tube lens 22, which corresponds to the lens 16, manipulation light is coupled into the detection beam path via the dichroic beam splitter 15.

With the embodiment of a light sheet microscope shown in FIG. 2, point-shaped manipulation of the sample is effected, wherein the focus can be set to the light sheet plane, or into regions above and below the light sheet plane, such that effectively spatial manipulation is possible, but in principle only successively for individual points. For this focus displacement into regions outside the light sheet plane, a further, adjustable optical unit, for example a collimator, can be inserted into the beam path between the stimulation laser 18 and the stimulation scanner 19, such that the manipulation focus is adjustable independently of the detection focus. With the corresponding configuration of the stimulation laser 18 and of the manipulation optical unit, the embodiment shown in FIG. 2 can also be used for multiphoton excitation. By introducing one or more further optical elements, for example a microlens array, between stimulation laser 18 and stimulation scanner 19, wherein the laser beam is expanded before the microlens array and is collimated again after, the point scanner used in connection with FIG. 2 can be converted into a multipoint scanner. This is not shown here.

FIG. 3 shows, in FIGS. 3A and 3B, two further embodiments of a light sheet microscope, in which the manipulation is effected by way of the detection objective. The module shown in FIG. 3B can be swapped for the module shown in FIG. 3A; both are coupled into the beam path at the same location, characterized by the dichroic beam splitter 15. The construction does not necessarily have to be modular here; rather, two independent light sheet microscopes can be generated, which are not able to be merged into one another. While in the arrangement shown in FIG. 2 in the case of a point scanner substantially point-shaped areas of the sample are impinged upon temporally sequentially by light intensity, or in the case of a multipoint scanner a multiplicity of such point-shaped areas are impinged upon temporally sequentially by a light intensity, wherein in each case a number of them are impinged upon by light intensity at the same time, the arrangements shown in FIGS. 3A and 3B make the spatial generation of intensity patterns in the sample possible, that is to say they make the simultaneous impingement of light intensity on a number of substantially point-shaped areas possible, wherein each point can be impinged upon independently of the other points and the points can be distributed not only in a plane, but spatially in a volume.

In the embodiment shown in FIG. 3A, the means for manipulation comprise a first spatial light modulator 23 for causing a specified intensity distribution to impinge on the sample. The light source used is again the stimulation laser 18. Since the phase of the light is changed using the spatial light modulator 23, the spatial light modulator (SLM) 23 must be arranged in a pupil plane; a wide lens 24 is therefore necessary for imaging. In addition, the arrangement also comprises a telescope 25, with which the illumination of the pupil or of the SLM 23 can be adapted. In order to adapt the polarization, optionally a polarization element 26, for example a polarizer or a half-wave plate, can be arranged in the beam path. In the case of FIG. 3B, instead of the SLM 23, a digital micromirror array (DMD) 27 is used, in which case the lens 24 can be dispensed with because the intensity is manipulated directly, with the DMD 27 being arranged for this purpose in an intermediate image plane of the manipulation beam path. The light source used in this case can again be the stimulation laser 18, although in principle incoherent light sources 28 can also be used, for example typical lamps—in particular in the UV range—or LEDs. The DMD 27 is used to generate an intensity pattern, that is to say a specified intensity distribution in a plane, preferably a plane parallel to the light sheet plane or in the light sheet plane.

In addition to FIG. 3A, the means for manipulation can comprise a second spatial light modulator (not illustrated here) for imparting a specified amplitude distribution on the specified intensity distribution.

FIG. 4 shows a further configuration for a light sheet microscope, in which the manipulation is effected by way of the detection beam path. In this embodiment, the spatial light modulator 23 comprises a first region 29, which is embodied for impingement of a specified intensity or amplitude distribution on the sample and as a correction element, and a second region 30, which is embodied as a correction element in the detection beam path. Deflection means for deflecting the light to be detected onto the second region 30 and the light used for the manipulation onto the first region 29 are provided here. In this case, the wavefront manipulators 7 in the detection objective O2 can be dispensed with. A phase pattern which serves exclusively for the correction of the aberrations which were caused by the oblique passage of the light through the separation layer system with the sample carrier 2 is imprinted on the SLM 23 in the second region 30 in this case; the light used for manipulation is not incident on said second region 30 but is deflected past it. The phase pattern for the spatial intensity distribution to be placed in the sample is imprinted on the first region 29 of the SLM 29, and additionally likewise the phase pattern for the correction of the oblique light passage. The beam progression is shown in FIG. 4. The light to be detected is shown in dashed lines, the manipulation light of the stimulation laser 18 with a solid line. The deflection means here comprise a dichroic element 31, the active optical surfaces of which, which are parallel with respect to one another, are preferably arranged perpendicularly to the active optical surface of the spatial light modulator 23. Two plane mirrors 32, 33, the mirror surfaces of which are likewise arranged parallel to the active optical surfaces of the dichroic element 31, are used to guide the beam path such that the light that is used for the manipulation and is to be detected is directed in each case twice onto the dichroic element 31. Using the dichroic element 31—the thickness of which is determined on the basis of the necessary beam offset of the partial beam paths on the SLM, wherein the beam offset itself is dependent on the size of the active surfaces of the SLM—the deflection onto the first region 29 and onto the second region 30 is achieved. In addition, two further lenses 34 and 35 are situated in the detection beam path, which produce 4f imaging, such that space for the accommodation of the additional components, that is to say the deflection means, is created.

Figure 5:
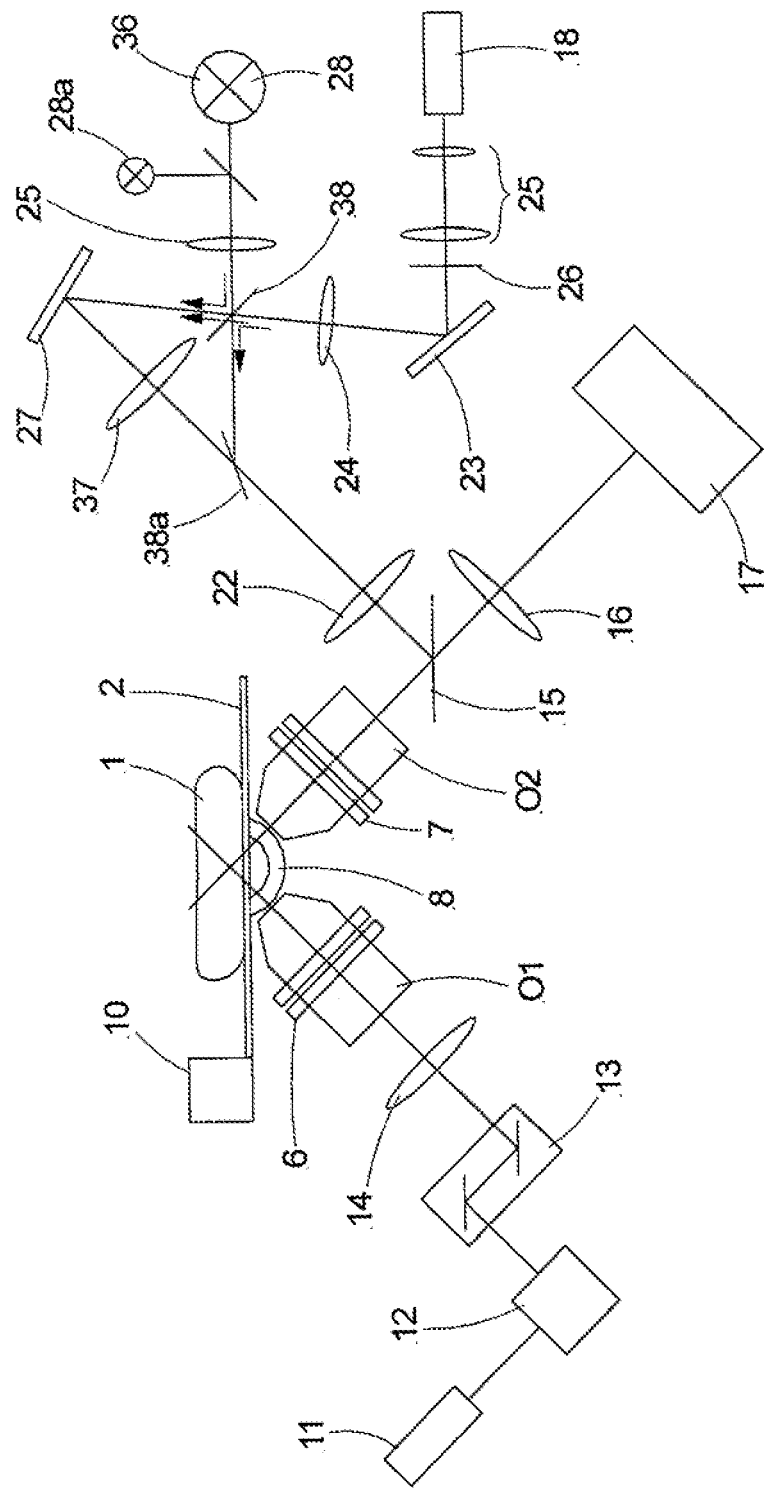

A particularly preferred configuration of a light sheet microscope, in which the manipulation is effected by way of the detection optical unit, is illustrated in FIG. 5. The means for manipulation here comprise both an SLM 23 with stimulation laser 18 and a DMD 27 with two light sources 28, 28a, which can be optionally coupled into the beam path for illuminating the DMD 27, via a light source switching mirror 36. In the case of the DMD beam path, the telescopic system 25 is symbolized only by a lens, which is also intended to symbolize a condenser. Arranged between the DMD 27 and the tube lens 22 is a further lens 37 which images the DMD 27 into an intermediate image plane, which is situated between the lens 37 and the tube lens 22. In the embodiment in accordance with FIG. 5, the light sheet microscope additionally comprises switching means, in particular a switching mirror 38, which serves as a central element by corresponding adjustment/rotation in the beam path for the selection of the manipulation means: Either only the DMD 27 or only the SLM 23 is connected as manipulation means, or both in combination. In particular in the latter configuration, in which the SLM 23 and the DMD 27 are coupled into the beam path at the same time using a beam combiner 38a, is it possible to increase the manipulation speed, because DMDs with frequencies of approximately 1 kHz are faster than efficient LCoS SLMs, which can be switched with approximately 60 Hz. Using a corresponding phase pattern, the SLM 23 can then define for example a plurality of spatial, delimited areas as ROIs (regions of interest), which can then be switched on and off quickly and individually by the DMD 27.

Another possibility (not illustrated) also consists in the generation of a desired pattern by an SLM or DMD or a plurality of SLMs and DMDs and the use of a scanning system for rapid switching between the patterns.

In the example shown in FIG. 5, a light source switching mirror 36 is used to select one of the two light sources with which the DMD 27 can here be illuminated. If the intention is to select between only two light sources, for example a laser and a conventional lamp, it is possible in the case of the use of a DMD 27 for producing the intensity distribution to dispense with such a light source switching mirror 36, if the light sources and the DMD 27 are arranged relative to one another in specific positions: The DMD 27 has an array of micromirrors which are switched between two fixed angles, for example between an angle of −12° for a first state "on" and +12° for a second state "off," measured in each case from the normal of the base area of the DMD 27 on which the micromirrors are arranged. If the light sources or the beam-steering thereof are arranged such that the DMD 27 is illuminated by one light source in the state "on" and by the other light source in the state "off" and the further manipulation beam path initially follows the direction of the normal of the base area of the DMD 27, the light source switching mirror 36 is not necessary. A combination with one or more light source switching mirrors, however, is possible to increase the selection of possible light sources, as in the case of the variant shown in FIG. 5.

Figure 6A:
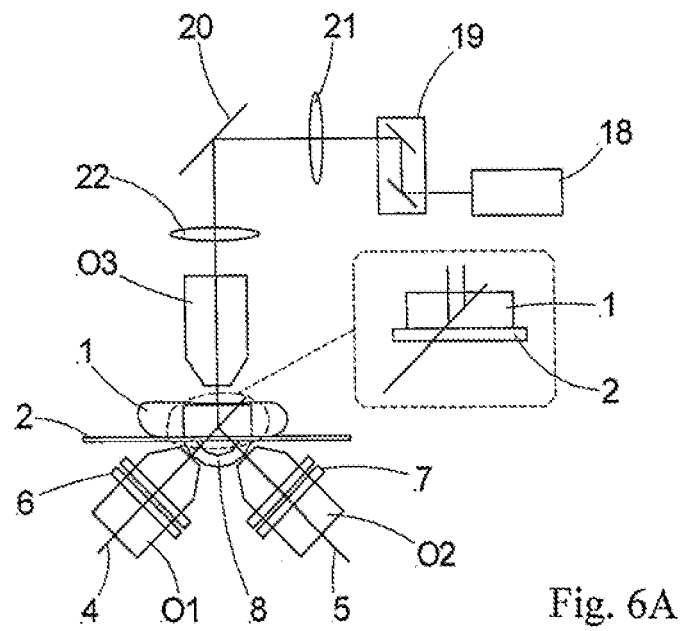
Figure 6B:
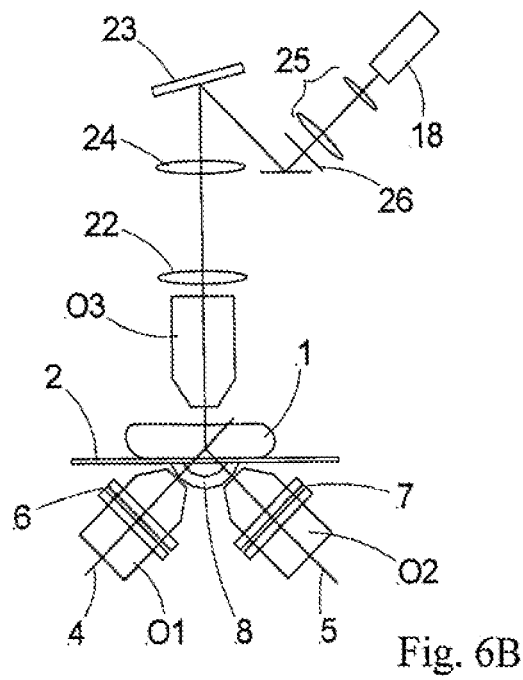
Figure 6C:
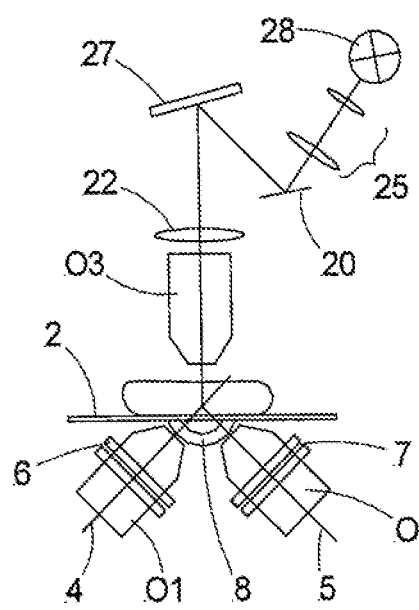

The means for manipulation can also comprise a dedicated manipulation objective, which is then arranged above the sample, that is to say on the other side of the sample carrier 2. Examples of this are shown in principle diagrams in FIGS. 6A, 6B and 6C. A manipulation objective O3 is here arranged with its optical axis parallel to the normal of the reference surface 3. However, this is not mandatory; the manipulation objective O3 can be arranged at any desired angle with respect to said normal, in particular it can be oriented such that its optical axis is parallel to the optical axis 4 of the illumination objective O1 or to the optical axis 5 of the detection objective O2, wherein the optical axis of the manipulation objective O3 can also coincide with one of the two optical axes of the illumination objective O1 or of the detection objective O2. FIG. 6A shows the use of a dedicated manipulation objective O3 with a point scanner analogously to FIG. 2, and the statements made with respect to the configuration shown therein can substantially be transferred to this configuration. Analogously, the embodiment, shown in FIG. 6B, with an SLM 23 corresponds to the embodiment in FIG. 3A, and the embodiment shown in FIG. 6C with a DMD 27 corresponds to FIG. 3B. A combination of a plurality of manipulation possibilities analogously to the combination described in connection with FIG. 5 for the detection objective is also possible here. Correction elements can be dispensed with in the case of manipulation from above, unless a sample container that is closed with a cover glass is used and the manipulation objective is oriented at an angle which differs from zero with respect to the normal of the reference surface.

For the manipulation, in principle two cases must be distinguished, which will be described below on the basis of the manipulation from above by way of a dedicated manipulation objective O3, but likewise apply to the manipulation by way of the detection or illumination objective. In the case of fast imaging of the volume, in which manipulation intensity impinges on the substantially point-shaped areas, by way of the light sheet system, it is possible to define the sequence of manipulation and imaging by way of the volume. In this case, the effect of the light distribution produced by the manipulation device in the volume of the sample can also be observed on the time scale of the imaging of said volume. The manipulation can then be performed both in the light sheet plane and in the volume region analogously to the manipulation as was described in connection with the manipulation by way of the detection objective O2. However, if the time scale on which the effect of the manipulation radiation is observed is so short that the manipulation must be observed directly within a camera frame, that is to say within the light sheet that is produced by way of the illumination objective O1 and detected by way of the detection objective O2, it must be ensured that the intensity distribution which is imprinted on the sample by way of the manipulation objective O3 is located in the light sheet plane, as is indicated in the dashed box in FIG. 6A. In the case of FIG. 6A, this can be effected by way of fast focusing of the point scanner, for example by internal focusing of the manipulation objective O3, by displacement of the tube lens 22, by the use of a quickly deformable lens, for example the lens EL-10-30 by Optotune, or by an adaptive optical element, such as a deformable mirror. In the case of an SLM, a corresponding spatial intensity distribution, which is located in the plane of the light sheet, can be specified.

Figure 7A:
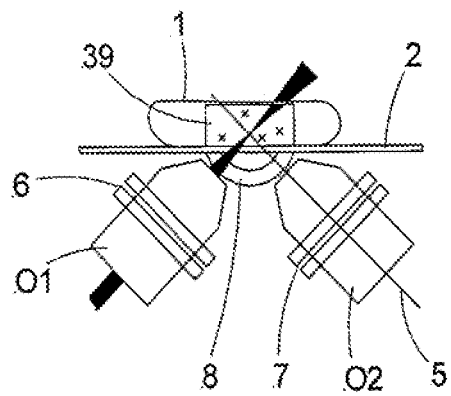

The manipulation can also be effected by way of the illumination objective O1, wherein the numerical aperture of the illumination objective is generally lower than that of the detection objective O2. Some methods, such as for example FRAP (fluorescence recovery after photobleaching), however, do not require a greater NA and can use the illumination objective O1 for the manipulation. Exactly as in the case of the manipulation using a dedicated manipulation objective O3, again two cases must be distinguished. In the first case, the volume imaging by way of the light sheet system is so fast that it is possible to define the sequence of manipulation and imaging by way of the volume. The effect of the light distribution produced by the manipulation device in the sample volume can also be observed on the time scale of the imaging of said volume. This case is illustrated in FIG. 7A. In a selected sample volume 39, at a specified time point, light intensity impinges on spatially distributed, substantially point-shaped areas of the sample, for example a specified intensity distribution which is converted, using an inverse Fourier transform algorithm, into a phase pattern that is imprinted onto a spatial light modulator. This can be achieved for example using a light sheet microscope, as is described in connection with FIG. 8.

Figure 7B:
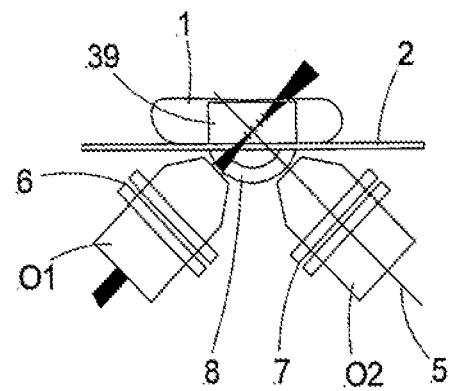

In the second case, the time scale on which the effect of the manipulation radiation is observed, is so short that it must be observed within a camera frame, that is to say within the light sheet that is produced by way of the illumination objective O1 and detected by way of the detection objective O2. This is shown in FIG. 7B, in which the point-shaped areas can be seen as lines of the light sheet, while they are distributed in the volume in FIG. 7A in the form of crosses.

Figure 8:
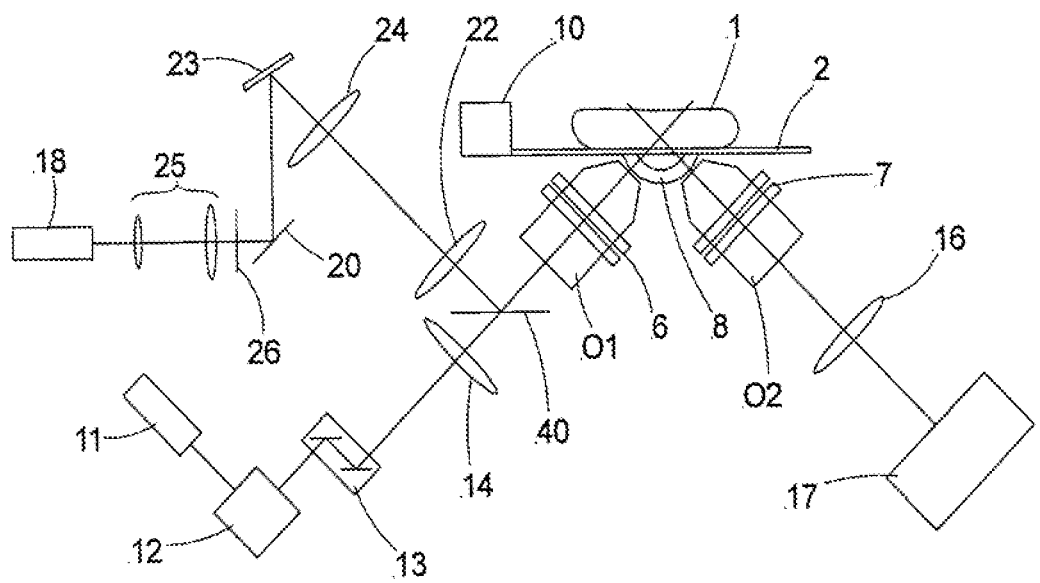

As already indicated, FIG. 8 shows a light sheet microscope, in which the manipulation objective is identical to the illumination objective O1. The means for manipulation here comprise again an SLM 23 in addition to associated light generation and imaging optical units. Input coupling into the illumination beam path is effected via a dichroic beam splitter 40.

Spatial light modulators are expensive and technically complex components. For this reason, it is advantageous when the manipulation is effected by way of the illumination objective O1 to use one and the same SLM both for generating the light sheet and for specifying an intensity distribution by way of widefield holographic methods. In preferred configurations, shown in FIG. 9 and FIG. 10, in which the manipulation objective is identical to the illumination objective O1, the illumination optical unit comprises a spatial light modulator 41, onto which a phase pattern for causing a specified intensity distribution or amplitude distribution to impinge on the sample is imprinted in the manipulation region 42, and onto which a phase pattern for the light sheet forming is imprinted in a light sheet generation region 43. Both regions are actuable independently of one another, that is to say the light sheet generation continues to be effected independently of the manipulation, even if the same element is used, which is not absolutely necessary. Analogously to the arrangement described in connection with FIG. 4, the SLM 41 can act again as a correction element, that is to say a corresponding phase pattern for correcting aberrations occurring due to oblique light passage can additionally be imprinted thereon. In order that light for the manipulation is directed exclusively onto the manipulation region (42) and light for the light sheet generation is directed exclusively onto the light sheet generation region (43), the illumination optical unit comprises corresponding deflection means which can also carry out spectral decomposition, because generally in each case different wavelengths are used for the light sheet generation and for the manipulation.

Figure 9:
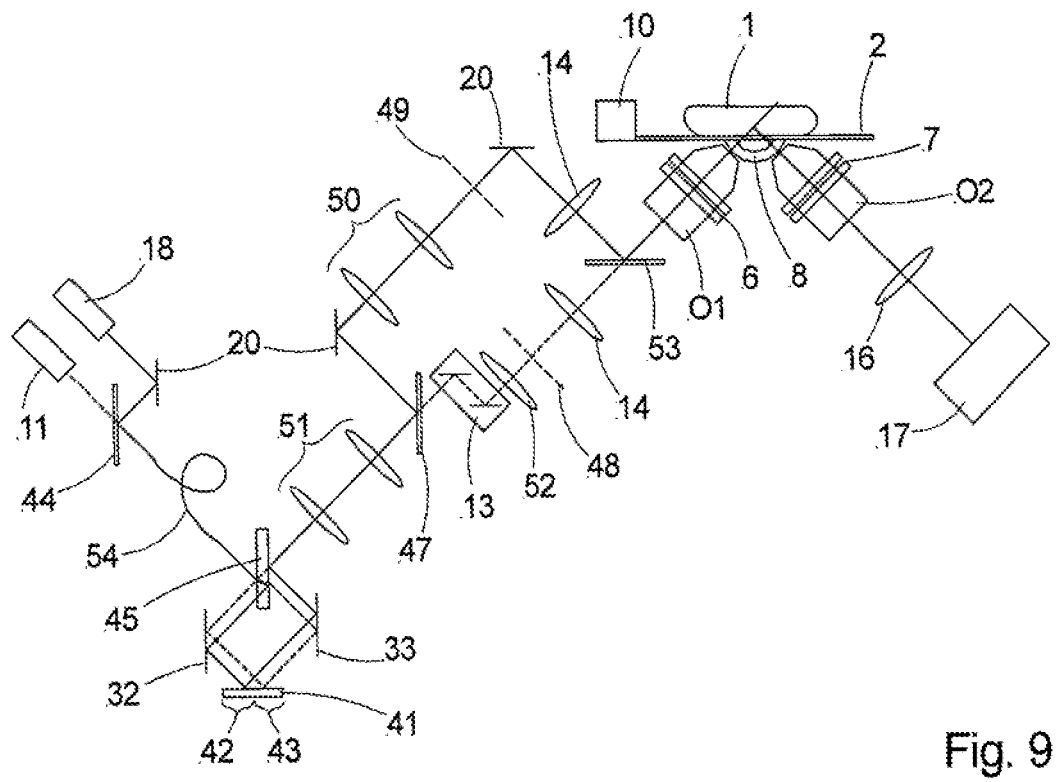
Figure 10:
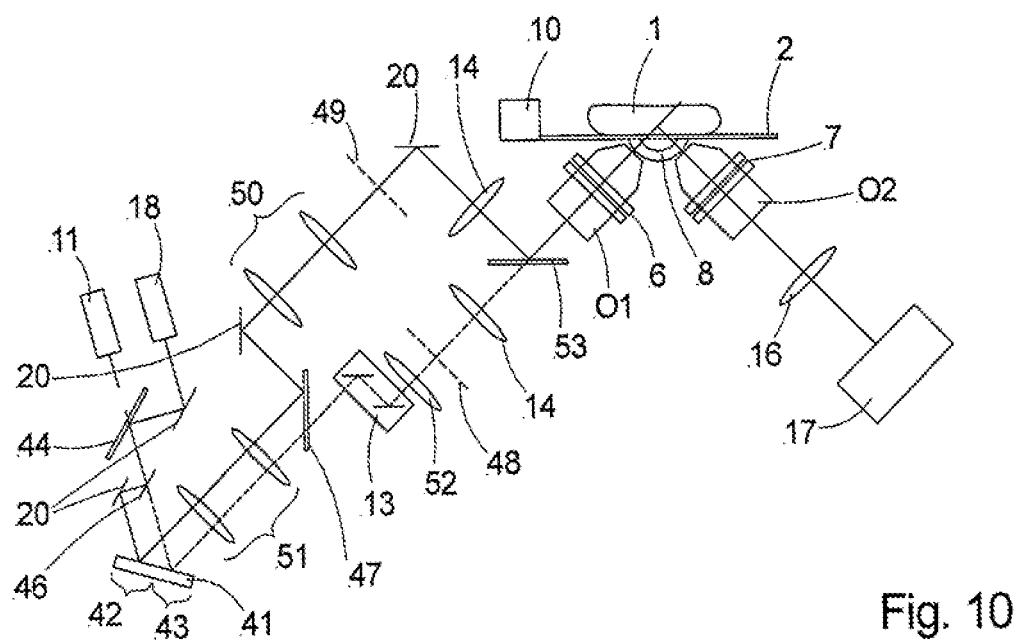

Two examples of light sheet microscopes in which an SLM 41 is used to generate both the light sheet and the intensity distribution are shown in FIGS. 9 and 10. It is a prerequisite that the stimulation laser 18 emits a different wavelength than the illumination laser 11, because this is used for beam separation. First, the light of both light sources is combined by way of a dichroic beam combiner 44 and subsequently split by a dichroic beam splitter 45 in FIG.

9 or a dichroic beam splitter 46 in FIG. 10, wherein in the configuration shown in FIG. 9, analogously to the arrangement described in connection with FIG. 4, the thickness of the dichroic beam splitter 45 is used for deflection purposes. The light used for illumination is steered onto the light sheet generation region 43, the manipulation light of the stimulation laser 18 used for producing the specified intensity distribution is steered onto the manipulation region 42 of the SLM 41. Next, both light beams are either combined, as shown in FIG. 9, or guided in parallel fashion, as shown in FIG. 10, onto a further dichroic beam splitter 47. In the case of the illumination of the SLM 41, the laser beams are expanded by corresponding lens combinations (not shown) such that they homogeneously illuminate the respective region on the SLM 41. The region of the SLM 41, which comprises the phase pattern for the light sheet forming, that is to say the light sheet generation region 43, must be located in the case of the further imaging in an intermediate image plane 48 of the imaging of the illumination objective O1. The manipulation region 42, on the other hand, must be located in a pupil plane 49 of the imaging of the illumination objective O1. Both regions of the SLM 41 must thus be embodied differently, which can be achieved by way of the further dichroic beam splitter 47 which splits again the beam paths for manipulation light and illumination light. By using a first optical unit 50, the manipulation region 42 is imaged into the pupil plane 49 of the illumination objective O1. The light sheet generation region 43 is imaged only by way of a second optical unit 51, by way of which the manipulation region 42 is also imaged, via the light sheet scanner 13 and a scanning lens 52 into the intermediate image plane 48 of the illumination objective O1. The two wavelengths are superposed again using a dichroic beam combiner 53.

The embodiments in accordance with FIG. 9 and FIG. 10 substantially differ only in the manner of the color separation. FIG. 9 illustrates a solution analogously to FIG. 4, in which the beams are always superposed, but which requires a dichroic beam splitter 45 on a relatively thick substrate so as to be able to attain sufficient separation on the spatial light modulator 41. The different wavelengths of the lasers can be guided for example by way of a common optical fiber 54, wherein it is also possible to use more than one light wavelength for manipulation and/or for light sheet generation. In contrast, FIG. 10 illustrates the otherwise typical separation of the different wavelengths onto different paths along the optical beam path.

It is also possible to dispense with the imaging of the manipulation region 42 into the pupil plane 49, that is to say it is also possible to use the SLM 41, which is imaged into the intermediate plane 48, for manipulation. A prerequisite is that the manipulation region 42 is spectrally separated from the light sheet generation region 43. Another possibility is to allow the manipulation to proceed rapidly sequentially, in which case it is only necessary to switch between the specified intensity distribution and the pattern for light sheet generation in time-synchronous fashion with the switching of the respective laser wavelength. However, in this way the intensity distributions which are producible in the sample are considerably limited in terms of number.

Also possible in principle is manipulation by way of the detection objective O2 using an SLM 41, which is divided into two regions, with a light sheet generation region 43 and a manipulation region 42, wherein, however, the beam guidance is somewhat more complicated than in the case of manipulation by way of the illumination objective O1.

As in the case of FIG. 2 for manipulation by way of the detection objective O2 or in the case of FIG. 6A in the case of manipulation by way of a dedicated manipulation objective O3, the means for manipulation can comprise a point scanner for temporally sequential impingement of light intensity on individual, substantially point-shaped areas of the sample even in the case where the illumination objective is identical to the manipulation objective. However, such a point scanner operates sequentially and can in the case of very rapid light sheet imaging cover only a very limited number of positions in the light sheet within an exposure sequence, in particular because the positioning of the intensity distribution must be performed axially, that is to say along the optical axis 4 of the illumination objective O1 and consequently by refocusing. It is therefore advantageous to initially deposit the manipulation radiation sequentially in the case of examinations of samples, that is to say deposit the intensity distribution along the optical axis at the specified points sequentially along the light sheet, and then rapidly image this substantially flat volume of the sample 1 with the light sheet. Since the light sheet scanner 13 and the stimulation scanner 19 are operated independently of one another, it is also possible during the light sheet imaging to perform manipulation in desired temporal and/or spatial intervals before or after the light sheet.

In particular it is advantageous here if the light sources, the wavelengths, and the intensities of the manipulation light are designed for exciting two-photon and multi-photon transitions; in this way, it is possible to restrict the impingement of the corresponding intensity on the sample to the respective focus, because the Gaussian beam of the point scanner in the case of linear excitation completely and, under certain circumstances, interactively penetrates the sample 1 along the optical axis 4 of the illumination objective O1.

Figure 11:
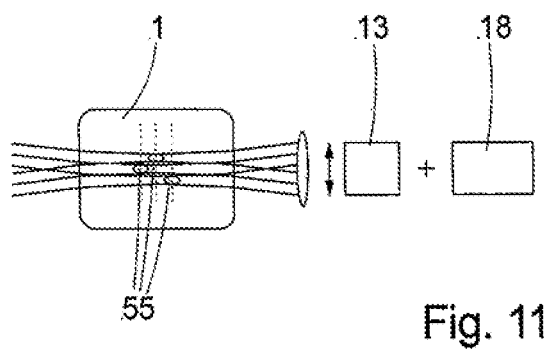

When using a point scanner with multi-photon excitation, axial restriction along the manipulation axis can also be attained using temporal focusing. This is shown for a light sheet microscope for example in FIG. 11. Temporal focusing is performed here in the light sheet, which is produced by scanning. Control via the location which is impinged upon with an intensity for manipulation is effected laterally by the scan in the light sheet, which is shown in FIG. 11 from above. The location of the focus along the light sheet axis, that is to say along the optical axis 4 of the illumination objective O1, is determined using the SLM and by way of the temporal focusing using the group velocity dispersion control of the stimulation laser 18. In this way, it is possible to sequentially deposit intensities for example at the three focus points 55 in the light sheet shown from above in FIG. 11.

Figure 12:
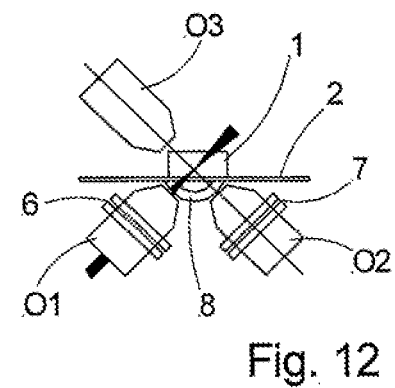

Of course, it is likewise possible for the sample to be impinged upon with intensity in areas not only from one direction but also from a plurality of directions, as is indicated in FIG. 12, wherein all three objectives, manipulation objective O3, detection objective O2, and illumination objective O1, are used for the impingement of light intensity on the sample. It is then possible for different manipulation methods and/or different wavelengths to be used from different directions. For example, two-dimensional regions can be produced simultaneously by way of the detection objective O2 using a DMD and a first wavelength, and spatially distributed areas can be produced sequentially by way of the manipulation objective O3 using an SLM. The DMD can assume the rapid manipulation in the light sheet plane; this is realizable also with incoherent light sources with wavelengths for example in the UV range, which are scarcely available as laser sources. The SLM, the phase pattern of which is imprinted on the sample as intensity distribution by way of the manipulation objective O3, can then sequentially manipulate spatial areas with other wavelengths.

The light sheet arrangement with two or more manipulation objectives also offers the possibility of coherently superposing manipulation radiation, that is to say the radiation for impingement of the sample with light intensity in substantially point-shaped areas from two or three directions. In this case, it may be advantageous if for example the detection objective O2 and the manipulation objective O3 have a common optical axis, because in that case the opposing wavefronts can interfere to the smallest possible extents of the intensity distribution in the light sheet plane. The manipulation objective O3 can be immersed to this end for example in a sample solution (not illustrated in FIG. 12), in which the sample is located. For coherent superposition, the jointly used stimulation laser 18 must be divided over the corresponding beam paths for the detection objective O2 and the manipulation objective O3.

If an objective pair is used which does not have a common optical axis, it is also possible to use a pump-sample method, such as CARS; the pump radiation and the sample radiation can here be guided through different objectives of the arrangement. Since the desired interaction occurs only in the overlap region of the pump radiation and the sample radiation, it is possible hereby to achieve an additional restriction of areas.

As already mentioned, a restriction of the intensity distribution in the direction of the optical axis of the objective used for the manipulation can be set highly advantageously using multi-photon excitation, in particular when using a point scanner for causing a corresponding light intensity to impinge on the sample, because here a focused beam is always present. In the approaches of microscopy in the wide field on the basis of the use of a spatial light modulator and/or a DMD, depending on the desired manipulation pattern a less focused beam is present than when using a point scanner, wherein, however, it is also possible to restrict the manipulation and intensity distribution in the propagation direction in the wide field using temporal focusing. In this way, the effect of depth discrimination, which occurs in the case of point-scanning two-photon microscopy due to the quadratic intensity dependence of the excitation in combination with strong focusing, can also be achieved in wide-field imaging.

Figure 13:
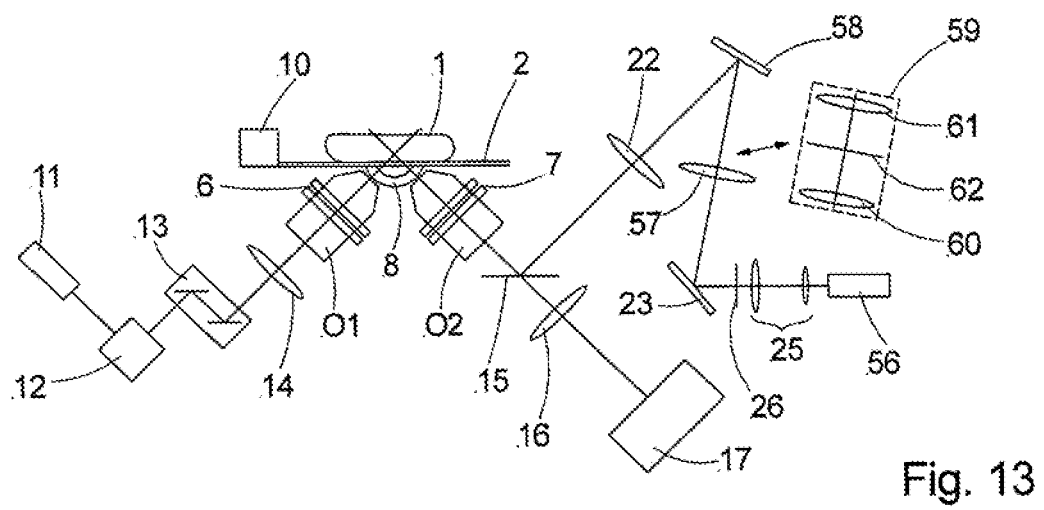

FIG. 13 shows a corresponding arrangement, in which multi-photon excitation is used for manipulation by way of the detection objective O2. A femtosecond short pulse laser 56 is used here as the manipulation light source. For example, a titanium-sapphire laser can be used. Using the telescope 25, the beam thereof is correspondingly expanded so as to illuminate the SLM 23 as completely as possible. A corresponding spatial phase pattern is imprinted on the SLM 23 for producing a specified intensity distribution in the sample. A first Fourier transform of the phase pattern is imaged via a lens 57 onto a correspondingly embodied diffraction grating 58. The diffraction grating 58 is located in an intermediate image plane in the detection beam path and is imaged into the sample by the tube lens 22 and the detection objective O2 using the correction elements, here the wavefront manipulators 7. Due to the spectral decomposition of the pulses at the diffraction grating 58, an axial restriction of the illumination occurs due to temporal focusing, limited to the desired point-shaped areas in the sample.

Instead of an individual lens 57, the phase pattern of the SLM 23 can also be imaged onto the grating via a 4f arrangement 59 with two lenses 60 and 61. A phase element 62 in a pupil plane of this 4f arrangement 59 results in a phase shift of the zero order of diffraction by $\pi$ with respect to the diffracted radiation, or vice versa. In this way, the phase pattern is converted after the 4f imaging directly into an intensity distribution on the diffraction grating 58.

Imaging in the case of the above-described light sheet microscopes can generally be performed in two ways:

In what is known as a sample scan, the illumination objective O1 and the detection objective O2 are positionally fixed, and the light sheet is positioned via the light sheet scanner 13 in the focal plane of the detection objective O2. The sample is then guided, via the sample-stage controller 10, in the direction shown in the dashed image section in FIG. 1.

In what is known as a light sheet scan, the sample 1 remains positionally fixed, but the light sheet must be scanned for imaging. To ensure that the light sheet does not move out of the focus, the detection objective O2 must be adjusted, and likewise the illumination objective O1, so that the beam waist of the light sheet remains at the center of the image field. Alternatively, the beam waist can also be adjusted by way of a different type of focusing, such as internal focusing etc.

Figure 14A:
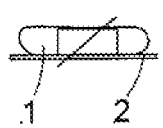
FIG. 14A illustrates a procedure for manipulation and imaging.

FIG. 14 shows different temporal and spatial sequences of manipulation and imaging. FIG. 14A illustrates simultaneous manipulation and imaging in the light sheet plane. The light intensity used for manipulation is here deposited in the light sheet plane at a given time point t, and the effect thereof can be observed immediately in this plane. This procedure can be best realized, in the case of a sample scan and in the case of a light sheet scan, using planar manipulation, for example utilizing a DMD, by way of the detection objective O2, that is to say for example using arrangements as shown in FIG. 3 or FIG. 4.

Figure 14B:
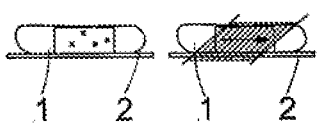
FIG. 14B shows the sequential sequence of manipulation and imaging.

FIG. 14B shows the sequential sequence of manipulation and imaging, both spatial and temporal. First, the specified spatial intensity distribution is deposited at the desired substantially point-shaped areas—indicated by crosses—in the observation volume, and then this observation volume, illustrated by the rectangular box in the sample, is imaged, possibly multiple times, to observe the temporal progression of the effect of the manipulation. This procedure can be used both in the case of the sample scan and in the case of the light sheet scan with in principle all previously mentioned variants that permit spatial manipulation, because no constraints are imposed on the manipulation by the sequential sequence.

Figure 14C:
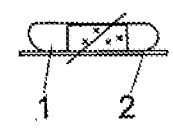
FIG. 14C shows a mixed procedure of manipulation and imaging.

In the mixed procedure shown in FIG. 14C, the manipulation radiation is introduced during the imaging light sheet scan at desired time points and/or at desired locations in the light sheet, in front of it and/or behind it. Moreover, there is also the possibility to continuously adapt the spatial manipulation volume, while the volume is being imaged, in order to compensate for very fast form changes in the sample in this way, or to produce two different volumes for light sheet positions for depositing manipulation intensity.

With the above-described arrangements for light sheet microscopy, a particularly gentle observation of the sample with simultaneous manipulation is possible.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

LIST OF REFERENCE SIGNS

1 Sample
2 Sample carrier
3 Planar reference surface
4, 5 Optical axis
6, 7 Wavefront manipulator
8 Optical transfer system
9 Manipulation beam
10 Sample stage controller
11 Illumination laser
12 Beam shaping unit
13 Light sheet scanner
14 Tube lens
15 Dichroic beam splitter
16 Tube lens
17 Camera
18 Stimulation laser
19 Stimulation scanner
20 Mirror
21 Laser
22 Tube lens
23 First spatial light modulator (SLM)
24 Lens
25 Telescope
26 Polarization element
27 Digital micromirror array (DMD)
28, 28a Light source
29 First region
30 Second region
31 Dichroic element
32, 33 Plane mirror
34, 35 Lens
36 Light source switching mirror
37 Lens
38 Switching mirror
38a Beam combiner
39 Sample volume
40 Dichroic beam splitter
41 Spatial light modulator
42 Manipulation region
43 Light sheet generation region
44 Dichroic beam combiner
45, 46 Dichroic beam splitter
47 Further dichroic beam splitter
48 Intermediate image plane
49 Pupil plane
50 First optical unit
51 Second optical unit
52 Scanning lens
53 Dichroic beam combiner
54 Optical fiber
55 Focal point
56 Femtosecond laser
57 Lens
58 Diffraction grating
59 4f arrangement
60, 61 Lens
62 Phase element
O1 Illumination objective
O2 Detection objective
O3 Manipulation objective

What is claimed is:

1. A light sheet microscope, comprising
means for generating a light sheet,
an illumination optical unit for illuminating a sample which is located on a sample carrier in a medium, said sample carrier being oriented parallel to a planar reference surface, via an illumination beam path with said light sheet, the latter having a light sheet plane that encloses an illumination angle that differs from zero with the normal of the reference surface,
a detection optical unit having a detection beam path with an optical axis, which encloses a detection angle that differs from zero with the normal of the reference surface in the region of the sample carrier,
a separation layer system with at least one layer that is made of a specified material with a specified thickness and separates the medium from the illumination and detection optical units, wherein the separation layer system is in contact, at least in the region that is accessible for illumination and detection, with the medium by way of a base surface that is parallel to the reference surface,
at least one correction element in the illumination and/or in the detection beam path for reducing such aberrations that occur due to the oblique passage of light that is to be detected or of light for illuminating the sample through interfaces of the separation layer system,
means for optical manipulation of the sample by manipulation light by causing manipulation light intensity to impinge on the sample in substantially point-shaped areas in a specified volume which at least temporarily comprises the light sheet plane, via at least one manipulation beam path,
means for sequential switching between an illumination of the sample by manipulation light and an illumination of the sample with the light sheet.

2. The light sheet microscope as claimed in claim 1, wherein the illumination optical unit includes an illumination objective and the detection optical unit includes a detection objective.

3. The light sheet microscope as claimed in claim 2, wherein the illumination objective is identical to the detection objective.

4. The light sheet microscope as claimed in claim 2, wherein a manipulation objective is positioned in the manipulation beam path.

5. The light sheet microscope as claimed in claim 4, wherein the manipulation objective is identical to the illumination objective or to the detection objective.

6. The light sheet microscope as claimed in claim 4, the means for optical manipulation further comprising a point scanner for temporally sequential impingement of light intensity on individual substantially point-shaped areas of the sample, or a multipoint scanner for the temporally sequential impingement on a plurality of substantially point-shaped areas of the sample, a respective quantity of which is able to be impinged on at the same time by light intensity.

7. The light sheet microscope as claimed in claim 6, wherein the means for optical manipulation comprise a first spatial light modulator for causing a specified intensity distribution to impinge on the sample.

8. The light sheet microscope as claimed in claim 7, wherein the means for optical manipulation comprise a second spatial light modulator for imparting a specified amplitude distribution to the specified intensity distribution.

9. The light sheet microscope as claimed in claim 7, wherein the means for optical manipulation comprise a digital micromirror array for producing a specified intensity distribution in a plane, parallel to the light sheet plane, and particularly in the light sheet plane.

10. The light sheet microscope as claimed in claim 9, further comprising a switching means for switching between the first spatial light modulator, the digital micromirror array, or a combination of both.

11. The light sheet microscope as claimed in claim 10, wherein said switching means, is a switching mirror.

12. The light microscope as claimed in claim 7, in which the manipulation objective is identical to the detection objective, and wherein a first region of a spatial light modulator is embodied for impingement of a specified intensity or amplitude distribution on the sample and as a correction element, and a second region of the spatial light modulator is embodied exclusively as a correction element in the detection beam path, wherein deflection means for steering the light to be detected onto the second region and the light that is used for the manipulation onto the first region are provided.

13. The light sheet microscope as claimed in claim 12, wherein the deflection means comprise a dichroic element having active optical surfaces which are arranged parallel with respect to one another and preferably perpendicularly to the active optical surface of the first spatial light modulator, wherein the beam path is guided such that the light that is used for the manipulation and is to be detected is guided in each case twice onto the dichroic element, and the deflection onto the respective region is achieved by way of the thickness of the dichroic element.

14. The light sheet microscope as claimed in claim 4, in which the manipulation objective is identical to the illumination objective, and wherein the illumination optical unit comprises a spatial light modulator, onto which a phase pattern for the light sheet forming is imprinted in a light sheet generation region and a phase pattern for causing a specified intensity distribution to impinge on the sample is imprinted in a manipulation region, and in that the illumination optical unit comprises means for deflecting the light for the manipulation exclusively on to the manipulation region and light for the light sheet generation exclusively onto the light sheet generation region.

15. The light sheet microscope as claimed in claim 14, wherein the light sources, wavelengths, and intensities of the manipulation light is designed for exciting two-photon and multi-photon transitions.

16. The light sheet microscope as claimed in claim 15, further comprising a mechanism for temporal focusing for axial localization of the intensity of the light that is used for manipulation along the axis of the manipulation beam path.

17. The light sheet microscope as claimed in claim 16, wherein said mechanism for temporal focusing comprises a femtosecond pulsed laser with a controller for controlling group velocity dispersion for axial localization of the intensity of the light that is used for manipulation along the axis of the manipulation beam path.

18. The light sheet microscope as claimed in claim 1, comprising a spatial light modulator comprising a manipulation region, onto which manipulation light is directed, and a light sheet generation region, onto which light for light sheet generation is directed, the light sheet generation region and the manipulation region overlapping at least partially.

19. The light sheet microscope as claimed in claim 1, comprising a stimulation laser emitting manipulation light, and comprising an illumination laser emitting light for light sheet generation, wherein the emission wavelengths of both lasers are different from each other and/or switching between illumination with manipulation light and illumination with the light sheet is time-synchronized with a switching of the stimulation laser and the illumination laser.

* * * * *

UNITED STATES PATENT AND TRADEMARK OFFICE
CERTIFICATE OF CORRECTION

PATENT NO. : 11,719,922 B2
APPLICATION NO. : 17/230613
DATED : August 8, 2023
INVENTOR(S) : Thomas Kalkbrenner et al.

It is certified that error appears in the above-identified patent and that said Letters Patent is hereby corrected as shown below:

In the Specification

Column 2, Line 30     now reads: "The light sheet used can here be"
should read -- The light sheet used here can be --

Column 3, Line 9     now reads: "A disadvantage is here that"
should read -- A disadvantage here is that --

Column 3, Line 33     now reads: "DMDs, It"
should read -- DMDs, it --

Column 8, Line 54     now reads: "manipulation, and"
should read -- manipulation --

Signed and Sealed this
Thirteenth Day of February, 2024

Katherine Kelly Vidal
*Director of the United States Patent and Trademark Office*